Dec. 28, 1943.   H. M. AUSTIN   2,337,795
THRUST BEARING
Filed Jan. 11, 1941

Inventor
Harry M Austin
by
Walter F Kaufman
Attorney

Patented Dec. 28, 1943

2,337,795

UNITED STATES PATENT OFFICE 2,337,795

THRUST BEARING

Harry M. Austin, East Petersburg, Pa., assignor to Armstrong Cork Company, Lancaster, Pa., a corporation of Pennsylvania Application January 11, 1941, Serial No. 374,065

12 Claims. (Cl. 308—41)

This invention relates to thrust bearings for journals and the lubrication thereof.

The invention provides a means of cushioning and absorbing axial thrust loads of rotating shafts or axles and also a means for lubricating such shafts or axles, the latter function being performed as a direct result of the operation of the cushioning means. Such operation provides for lubrication at the time of the greatest need.

The drawing illustrates the invention as applied to a railroad car wheel axle, though it is applicable to other rotating axles or shafts which have an end thrust.

During the operation of a train, the vibration of the cars causes the vehicle to sway slightly even on the straightest stretches of track. This sway, as well as the operation of the car over rough tracks and around turns in the track, results in lateral shifting of the journals of the wheels relative to the journal bearings. This invention provides for the cushioning of such end thrusts and makes use of the end thrust in the form of a pump to lubricate the journal whenever the journal shifts outwardly with respect to the journal bearing. The cushioning effect of the invention also softens the blows transmitted to the side frames of trucks, reduces wear on the wheel flanges and the rails, and also absorbs the shock when the car enters curves. When the wheels run over joints and other irregular parts of the track, the "nosing" effect, that is, the repeated rebound of the wheels from one rail to the other, is effectively reduced by the invention.

Figure 1:
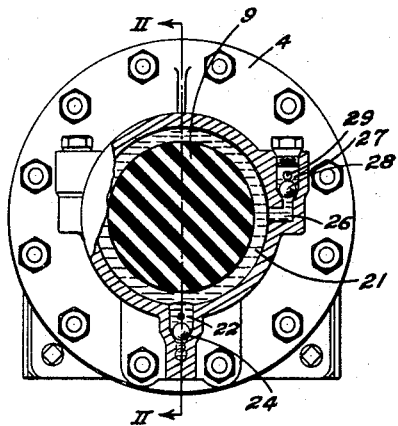
Figure 1 is an end elevation, partly in section, of the invention as applied to a journal of a railroad car wheel.
Figure 2:
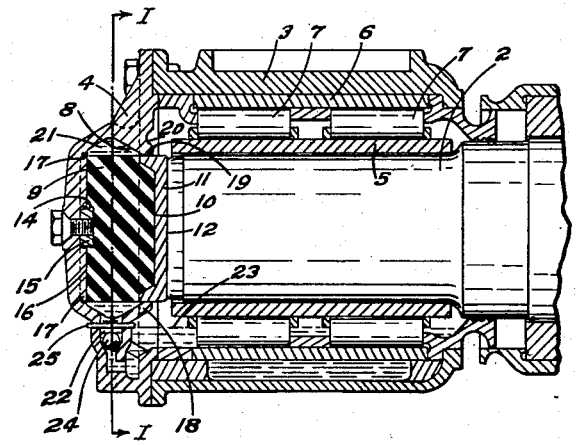
Figure 2 is a sectional view taken on line II—II of the Figure 1.
Figure 3:
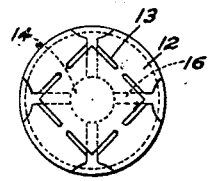
Figure 3 is an elevational view of the resilient thrust bearing of modified design looking at the face against which the journal bears.

In Figures 1 and 2, there is shown a journal 2 in a journal box 3 having an end cover 4. In the form shown in the figures, the journal is provided with an anti-friction alloy sleeve 5 and the journal box is provided with a similar sleeve 6 fitting internally thereof. These sleeves constitute an anti-friction race for the roller bearings 7 operating in the annular space therebetween. The cap or cover 4 of the journal box is provided with a recess or chamber 8 of roughly cylindrical shape within which an elastic cushioning member 9 fits. This cushioning member consists of an oil-resistant synthetic rubber or rubber substitute in the form of a substantially cylindrical block, to the inner surface 10 of which there is vulcanized a facing or thrust plate 11 of a suitable anti-friction alloy or metal. This thrust plate may be grooved on its external face 12 as shown by the solid lines 13 in the modified form of Figure 3. The grooves 13 facilitate flow of oil along the end of the journal. As shown more particularly in Figure 2, this block of elastic material is provided with a central cylindrical recess 14, into which a suitable nut 15, such as shown in Figure 2, may be vulcanized to provide for fastening the block in the recess 8. The cushioning block is also provided with positioning slots 16 which fit around ribs 17 formed on the inside of the protruding portion of the cover 4. The cover is provided with an inwardly projecting flange 18 having a cylindrical bearing face 19 adjacent the inner face 20 of the cover, and it has an annular channel 21 just back of this cylindrical bearing surface 19, the channel being formed by making the recess of greater diameter than the diameter of the cylindrical bearing surface. There is provided a passage 22 at the bottom of this channel to connect it with the lower portion of the journal box below the oil level 23. This passage is provided with a ball check valve 24 and a pin 25 to prevent the ball from being lifted entirely out of the passage into a portion of the annular channel 21 where it might be caught by the operation of the cushioning block. As shown in Figure 1, the annular channel is provided with two passages 26, one at each side extremity thereof, which are connected with short vertical passages 27 containing the ball check valves 28 and transverse discharge passages 29 opening into the journal box at points in the cover outside the area occupied by the inner face of the resilient block.

In operation of the vehicle, when the journal moves laterally outwardly with respect to the journal box, the cushioning block is compressed in an axial direction, and this compression causes the block to bulge laterally or radially into the channel 21 surrounding it. Since this annular channel is entirely sealed, except for the operation of the ball check valves, the bulging of the cushioning block into the annular channel causes the opening of the ball check valves 28 in the discharge passages 27 into the bearing while maintaining the ball check valve 24 in the bottom of the cover in a closed position. If the annular channel were filled with air to start with, the next movement of the journal in the opposite direction, that is, inwardly with respect to the journal box, results in the closing of the upper check valves 28 and the opening of the lower check valve 24 with the sucking of oil into the annular chamber 21. The next movement of the journal outwardly with respect to the journal box results in the pumping of oil into the upper regions of the journal bearing housing, thereby lubricating the journal and the bearings. Of course, once the annular channel has been filled with oil, it remains filled thereafter, and every outward movement of the journal relative to the journal box results in discharging oil into the journal housing.

Figure 4:
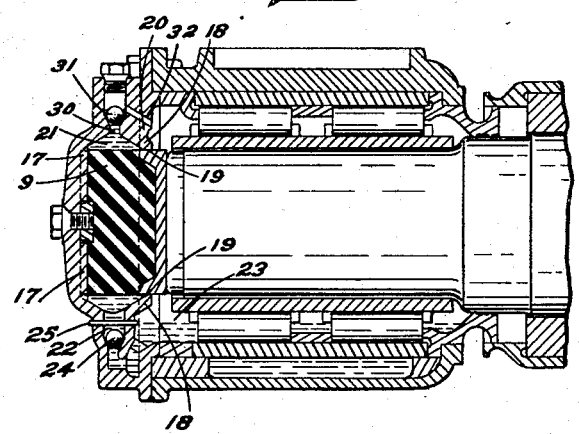
Figure 4 shows a modified arrangement in the form of a cross-section similar to Figure 2.

Figure 4 shows a modification of the device in which the annular channel 21 surrounding the cushioning block 9 is provided with a passage 30 and a ball check valve arrangement 31 at the top thereof so that the oil pumped by the cushioning block is discharged into the journal bearings from the passage 32 near the top of the cover of the journal boxes. Obviously, the annular chamber may be provided with discharge passages at the top only, at the sides, or at both the top and the sides. The several discharge passages may, if desired, be placed at any suitable points around the periphery of the annular chamber and their openings into the housing may be arranged to direct the oil upon any part of the journal or journal bearings within the housing.

Figure 5:
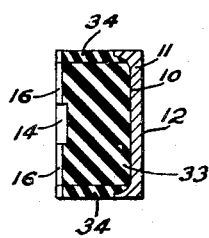
Figure 5 shows a modified form of cushioning element.

In Figure 5, there is shown a modified form of a cushioning block. In this form, instead of making the entire block out of an oil-resistant synthetic rubber or rubber substitute, the internal portion 33 thereof is made out of ordinary rubber, while the circumferential portion 34 which comes into contact with the oil in operation is made out of an oil-resistant synthetic rubber or rubber substitute.

For the oil-resistant material, any of the synthetic rubbers or rubber substitutes, such as Neoprene, polymerized isoprene, polymerized butadiene, Thiokol, butyl rubber, Ameripol, Buna S, Perbunan, Perbunan extra, which are oil-resistant and highly elastic are suitable.

While the invention has been described with respect particularly to railroad car journals with roller bearings, it is obvious that it may be applied to the friction type of journal and to any rotating axles or shafts to which there is imparted an axial thrust by virtue of the operation thereof. It is also obvious that the invention is applicable to such shafts or axles whether they are in a horizontal, vertical, or any other angular position.

The invention is not to be understood as restricted to the details set forth, since these may be modified within the scope of the appended claims, without departing from the spirit of the scope of the invention.

I claim:

1. In a device of the character described, a journal, a housing surrounding said journal and containing bearing means in which said journal is axially movable, and means for pumping oil from the lower to the upper region in said housing, said pump means comprising an elastic, thrust bearing member having one end adjacent the end of the journal and the opposed end fixed in said housing; a fluid-tight guideway on said housing for permitting sliding therein of the end of said elastic means adjacent the end of said journal; a chamber in said housing laterally of said elastic means and contiguous therewith; an inlet valve joining said chamber to the lower regions in said housing; and an outlet valve joining the said chamber to an upper region of said housing.

2. In a device of the character described, a journal, a housing surrounding said journal containing bearing means for said journal, said housing comprising an end cover having a recess containing a substantially cylindrical elastic block with a fluid-tight fit in the opening of the recess of the cover, said recess having an enlarged diameter in said cover beyond said opening, thereby forming an annular chamber about the periphery of said block, an inlet valve joining said chamber to the lower regions in the housing and an outlet valve joining said chamber to an upper region of said housing, said elastic block serving to cushion the end thrust of said journal and to pump oil from the lower regions of the housing through said chamber into an upper region in said housing, whereby said journal and journal bearing are lubricated effectively by the action of the block resulting from the movement of the journal within said housing.

3. In a device of the class described, an axially movable journal, bearing means for said journal, a fluid receiving chamber communicating with a source of supply of lubricating fluid, an elastic, thrust bearing element in said chamber and having a portion extending through a fluid-tight opening in a wall of said chamber, said element portion being capable of limited axial flow into said chamber upon axial compression thereof to expand said element radially and reduce the volumetric capacity of said chamber, means for transmitting axial thrust of said journal to said element to axially compress and radially expand the same and reduce the capacity of said chamber, and a conduit for directing lubricating fluid from said chamber to said bearing upon reduction in the capacity of the chamber by said radial expansion.

4. In a device of the class described, an axially movable journal, a lubricating fluid receiving chamber associated with the journal and containing an elastic thrust bearing element having a portion extending through a substantially fluid-tight opening in a wall of said chamber, said portion being capable of limited flow into said chamber upon axial compression thereof to reduce the volumetric capacity of said chamber by radial expansion of said element in said chamber, a source of supply of lubricating fluid communicating with said chamber, a conduit for directing lubricating fluid from said chamber, and means for axially compressing and releasing said elastic element to radially expand and release said elastic element in response to axial movements of said journal to effect transmission of lubricating fluid from said source to said chamber and from said chamber to said conduit.

5. In a device of the class described, an axially movable journal, a fluid receiving chamber containing an elastic thrust bearing element having a portion extending through a substantially fluid-tight opening in a wall of said chamber, said portion being capable of flow into said chamber upon axial compression thereof to reduce the volumetric capacity of said chamber by radial expansion of said element in said chamber, a conduit for directing fluid from said chamber, a check valve automatically preventing the flow of lubricating fluid from said chamber to said conduit upon reduction of pressure in said chamber, and means for axially compressing and releasing said elastic element to radially expand and release said element in said chamber in response to axial movement of said journal to effect transmission of lubricating fluid from said chamber to said conduit.

6. In a device of the class described, an axially movable journal, a fluid receiving chamber, an elastic thrust bearing element having a portion extending through a substantially fluid-tight opening in a wall of said chamber, said portion being capable of limited flow into said chamber upon compression thereof to reduce the volumetric capacity of said chamber by radial expansion of the elastic element therein, a source of supply of fluid communicating with said chamber, a conduit for directing lubricating fluid from said chamber, a valve automatically preventing the flow of lubricating fluid from said source into said chamber upon the development of pressure within said chamber, a valve automatically limiting the flow of lubricating fluid from said chamber to said conduit upon the diminution of pressure in said chamber, and means for axially compressing and releasing said elastic element in response to axial movement of said journal to alternately increase and diminish the pressure therein and effect transmission of fluid from said source to said chamber and from said chamber to said conduit by alternately radially expanding and releasing said element in said chamber.

7. In a device of the class described, a journal; bearing means for said journal and in which said journal is movable axially; a housing; a fluid-receiving chamber in said housing; a conduit connecting said chamber with the upper region of said housing; an elastic thrust bearing element mounted in said chamber and extending axially through an opening in the wall of said chamber with a fluid-tight fit, said elastic element being laterally expanded in said chamber by axial thrust of said journal toward said chamber to reduce the chamber volume.

8. In a device of the class described; a journal; a housing containing bearing means for said journal, said journal being axially movable in said bearing; and means for pumping oil to said bearing, said pumping means comprising an enclosed oil-containing chamber, an outlet passage connecting said chamber with said bearing, and an elastic block substantially fixedly mounted in said chamber and extending through an opening in the wall thereof into operative engagement with an end of said journal so that axial thrust of said journal causes lateral expansion and an increase in volume of the portion of said elastic element located in said chamber and causes flow of oil through said passage.

9. In a device of the class described, a housing containing bearing means, a journal axially movable in said bearing, and means for pumping oil from the lower region of said housing to the upper region of said housing, said pump means comprising a substantially fully enclosed oil chamber having an opening in the wall thereof; outlet passage means connecting said chamber and said upper housing region; inlet passage means connecting said chamber and said lower housing region; a check valve in said inlet passage means permitting flow of oil only into said chamber; an elastic block in said chamber having a portion extending through said opening with a substantially fluid-tight fit; and bearing means between said block and the end of said journal so that axial movement of said journal toward said chamber causes lateral expansion of said block in said chamber, said block serving to cushion the axial thrust of said journal and to pump oil from said chamber to said upper housing region on axial movement toward said chamber and to draw oil into said chamber on axial movement of said journal away from said chamber.

10. A lubricant pumping and thrust bearing unit for longitudinally, axially movable journals and the like, said unit comprising a housing member; a lubricating fluid chamber formed in said member; an opening in a wall of said chamber; outlet passage means communicating with said chamber; and an elastic cushioning element in said chamber, said element being normally smaller than said chamber and having a portion extending through said chamber opening with a substantially fluid-tight fit for operative connection with an end of such an axially movable journal so that axial movement of said journal towards said chamber radially expands said element in said chamber to pump lubricating fluid from said chamber through said passage means.

11. A lubricant pumping and thrust bearing unit as claimed in claim 10, which includes an inlet passage communicating with said chamber; and a check valve in said inlet passage and only permitting flow of lubricating fluid into said chamber.

12. A lubricant pumping and thrust bearing unit, as claimed in claim 10, in which said passage means permits flow of fluid from said chamber only upon radial expansion of said element; and which includes an inlet passage communicating with said chamber; and a check valve in said inlet passage, said check valve not permitting flow of fluid from said chamber upon radial expansion of said element in said chamber and permitting flow of fluid into said chamber only upon radial contraction of said element from its radially expanded condition.

HARRY M. AUSTIN.